Patented May 3, 1927.

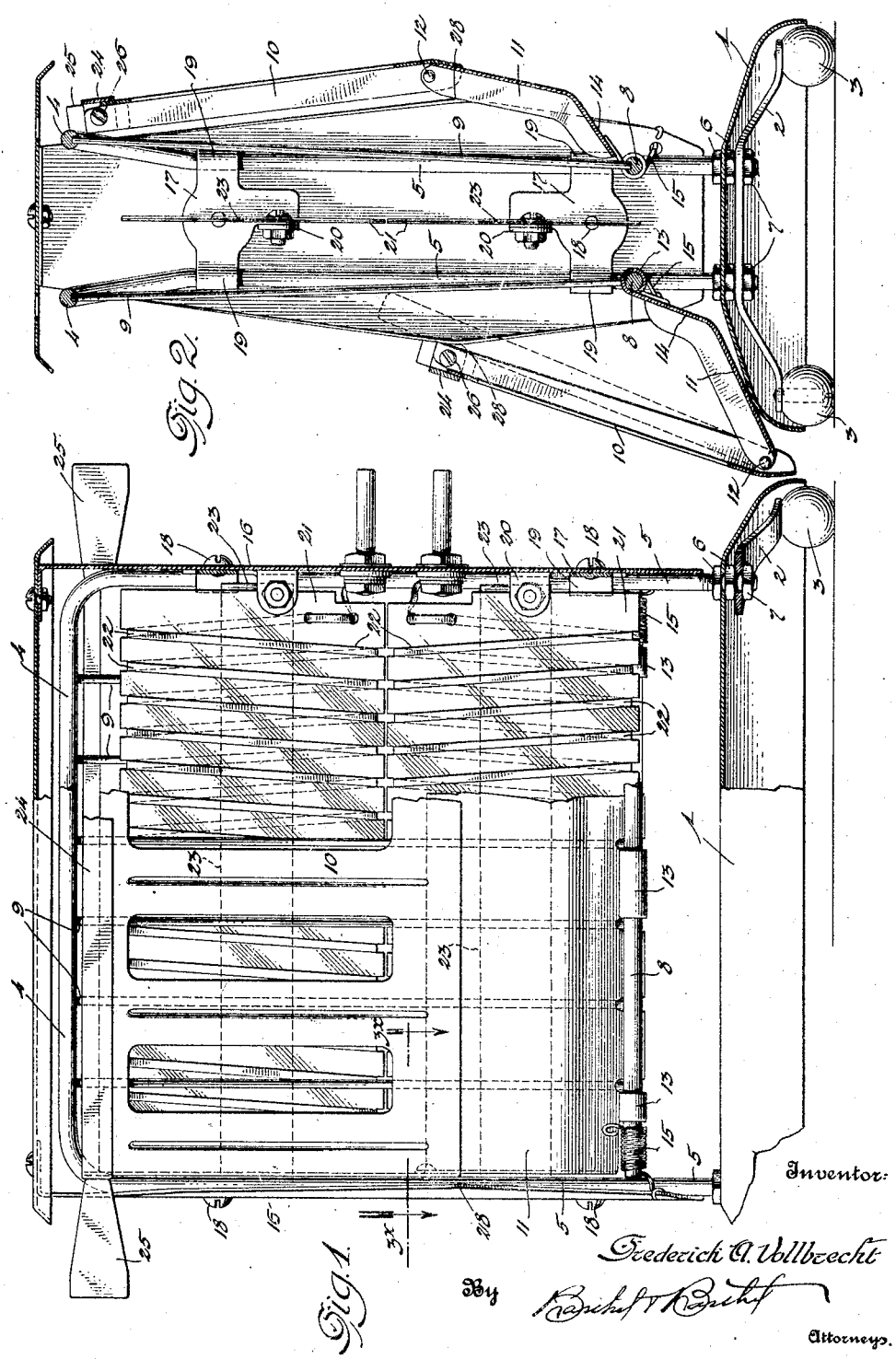

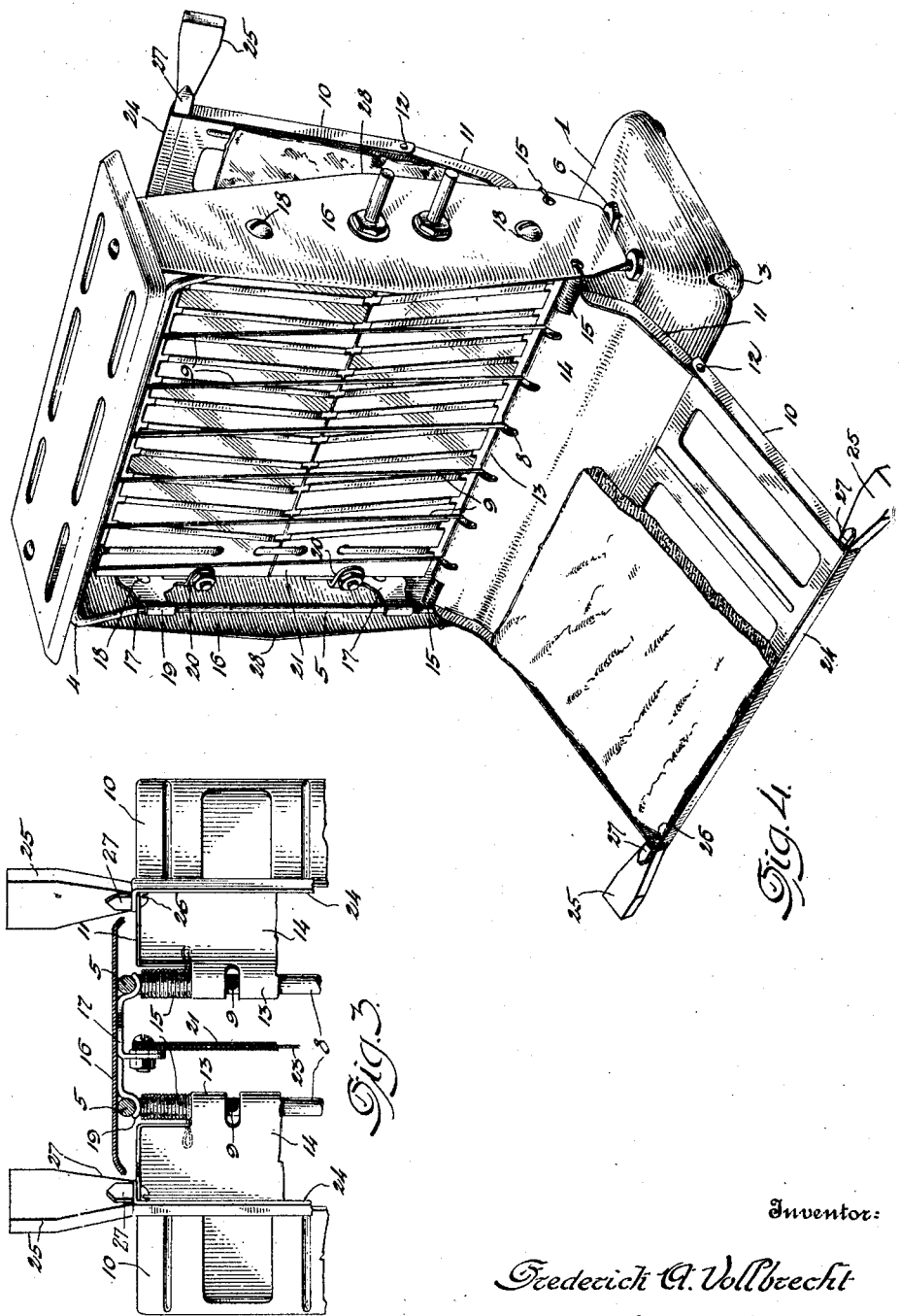

1,626,894

UNITED STATES PATENT OFFICE.

FREDERICK A. VOLLBRECHT, OF DETROIT, MICHIGAN.

ELECTRIC TOASTER.

Application filed February 20, 1925. Serial No. 10,540.

This invention relates to electric toasters of the vertical type wherein the heating element is enclosed by downwardly swingable trays which permit of the examination of bread from time to time to ascertain its toasted condition, and wherein such trays are adapted to operate in a manner effecting the turning of the bread so that both sides thereof may be toasted without necessitating its being touched by the hands of the person using the toaster.

Hitherto it has been usual in upright electric toasters having bread turning features to use an inclined grid to assist the turning of the toast, the variation in the spacing of such grid from the upper and lower parts of the heading element being such that an increased winding or heavy element has been necessary where the spacing of the grid was greater in order to secure even toasting, this variation in the element reducing the life thereof and the arrangement effecting the general proportions of the toaster due to the substantial angle of the grids with respect to the heating element.

In my pending application, Serial No. 722,468, filed June 26, 1924, I disclose a form of jointed tray which lends itself very effectively to the examination and reversal of the bread as required.

This invention has for its objects to still further develop the type of toaster disclosed in the said pending application whereby simplicity in manufacture and certainty of operation in the manner desired is secured; to provide a construction in which the grids are approximately vertical, assisting in the positioning of the bread in a manner permitting of its easy examination and retaining the bread when being toasted in such position relative to the heating element, so that the said heating element may be uniformly wound or distributed and at the same time effect a uniform toasting of the bread; and to provide for the mounting of the said grid and tray upon a common frame and the securing of the said frame to the structure or support of the toaster whereby an assembly is obtained which is of a simple and durable nature and does not offer obstructions upon which crumbs or dust are liable to collect, which is easy to clean as a whole, and which admits of ready disassembling for cleaning or repairing purposes.

A further object is to provide a special form of assembling clip adapted to receive and support the heating element with or by the said grid frame or frames together with the securing of the said grid frame in relative position to the casing of the toaster.

The invention further aims to provide a stop device which is operable upon the outward and downward swinging of the tray to prevent the sliding of the bread from the said tray.

Still further objects subsidiary to or resulting from the aforesaid objects, or from the construction or operation of the invention as it may be carried into effect, will become apparent as the said invention is hereinafter further disclosed.

In carrying the said invention into effect, I may provide a vertical toaster comprising a base to which is secured a pair of spaced inverted U-shaped members forming grid frames and including vertical or approximately vertical grids, transverse plates exterior to and abutting the legs of the said U-shaped grid frames, clips engaging and securing the said legs and the said end plates together, said clips also supporting vertical heating elements between the grids and trays swingably mounted at their lower ends on cross bars extending between the legs of each of the U-shaped frames, the said trays being divided and hinged intermediate of their length whereby the lower parts of the trays may be swung outwardly independent of the upper parts thereof and the upper parts of the said trays thereafter swung outwardly to bring the said trays as a whole to an outwardly swung position. The free ends of the said trays are preferably provided with stop members adapted to be rotated upon the lowering of the trays to form abutments preventing the slipping of bread from the trays when they are fully lowered.

All of which is more particularly described and ascertained hereinafter, by way of example, having reference to the accompanying drawings, wherein—

Figure 1 is a broken elevation, partly in section, illustrating a toaster embodying the said invention;

Figure 2 is a transverse section of the same;

Figure 3 is a fragmentary detail sectional view taken on the line $3^x$—$3^x$, Figure 1, but illustrating the trays in their partially depressed position; and Figure 4 is a perspective view of the toaster.

Similar characters of reference indicate similar parts in the several figures of the drawings.

1 is the base of the toaster which is provided with supports in the form of plates 2 having ball feet 3 secured thereto, and 4 are grid frames of inverted U-shape, the legs 5 of which extend through and are secured to the base 1 by nuts 6, and to the plates 2 by further nuts 7.

Extending between the legs of each of the U-shaped frames, are cross bars 8, and extending between these cross bars and the upper horizontal members of the said U-shaped frames are a plurality of wires or rods 9 forming grids which are approximately vertically disposed, in the present instance, the U-shaped members being bent slightly outwardly near the upper ends thereof in order to give a slight outward inclination to the said grids.

10 and 11 indicate upper and lower parts respectively of two-parts trays hinged together at 12, the lower tray being provided with tubular members 13 through which the cross bars 8 pass and also with portions 14 adjacent to said cross bars and inclined or bent inwardly with respect to the outer portion of the said members 11 of the trays. The trays are held in normal raised or closed position by springs 15.

End plates 16 are secured to the legs 5 of the grid frames 4 by means of clips 17 attached to the said plates by screws 18 and having bent portions 19 embracing the legs of the said grid frame, the said clips being also provided with lugs 20 supporting the dielectric plates 21 of heating elements 22 between the grids in such manner that the said heating elements are vertically disposed and are approximately parallel to the said grids, therefore the said heating elements may be evenly distributed over the dielectric plates in order to evenly toast bread which may be held against the grids by the trays as distinguished from the heating elements of toasters of similar type hitherto known wherein variation in the disposition or gauge of the heating elements has been necessary due to lack of parallel relation between the grids and the said heating elements. 23 are reinforcing members of steel or other suitable material passing longitudinally through the dielectric plates.

The upper or free ends of the trays are provided members 24 having secured thereto handles 25, and which members are rotatably attached to the said trays by screws 26, so that by the twisting of the handles the said members 24 may be rotated so that they lie approximately in a plane with the trays or at right angles thereto as indicated in the lowered tray of Figure 4, in which position the said members act as stops to prevent bread from sliding from the trays when they are lowered.

It will also be noticed that the said members are provided with extended ends 27 which are adapted to ride along the edges of the end plates 16 and that these end plates increase in width from their upper ends so that at 28 they project substantially beyond the grids.

As already indicated, the trays are intended to be actuated either to disclose the toasted face of the bread for examination or to effect the reversal of the bread in order that the opposite side thereof may be toasted; and for the former purpose it is only necessary that either tray be swung outwardly as a whole, without flexing the tray on its intermediate hinges 12, as is shown by the disposition of the rear tray of the illustration, Figure 4. This simply causes the bread to fall away from the grid with the tray due to the fact that the grids do not lean inwardly but are approximately vertical or lean outwardly, and the face of the bread is therefore disclosed to view.

If it be desired to reverse the bread, the tray is depressed as illustrated in the left hand portion of Figure 2, keeping the extensions 27 of the members 24 in abutment with the edges of the end plates so that the said extensions ride downwardly over such edges, and the two parts 10 and 11 of the tray are respectively flexed on their hinges 12, causing them to form a pocket into which the lower end of the bread slides as is indicated in dotted lines in the said Figure 2, the initial movement of the said bread being effected over and accelerated by the inclined portion 14 of the lower part of the tray. The falling of the bread to the said position is also permitted by the fact that the upper free end of the tray is spaced from its respective grid to a sufficient extent for that purpose by the widened portions 28 of the said end plates.

When the bread has assumed this intermediate position, the part 10 of the tray is then swung outwardly to a lowered position as clearly indicated in the foreground of Figure 4, whereupon the bread continues to slide over the now lowered part 10 until it completely lies upon the tray and comes into contact with the stop 24 which, in the process of lowering the said tray, is turned to a position at right angles thereto when the lowering of the said tray is effected by means of the handles 25 as will be apparent. It will now be understood that the toasted face of the bread is underneath, so that if the tray be now raised to its closed position the untoasted face of the bread will be brought into contact with the grid and subjected to the heat of the heating element.

The upright disposition of the grids readily facilitates these operations as the grids do not offer the same resistance to the sliding of the bread which they would were they substantially inclined inwardly of the toaster as is usually the case, neither do they form a support for the bread which would tend to prevent it swinging outwardly with the tray for inspection as described, as the bread has a natural tendency to fall outwardly with the tray under these circumstances.

From the standpoint of construction the simplicity of the device commends itself inasmuch as the grid frames and grids forming units and also supports for the trays may be readily assembled to the base and in the casing of the toaster, and when in toasting position there are no projecting surfaces tending to form obstructions which would otherwise form collecting places for crumbs or dust all of which simply descends to the base of the toaster, which is, therefore, easily cleaned and maintained clean.

The simple assembly of the device also admits of the ready interchanging of heating elements and their dielectrics when desired, and the fact that the said heating elements are evenly distributed ensures a longer life thereof than is secured where provision must be made for excess heat in different parts of the device, as in toasters having grids substantially inclined one towards the other with the heating elements varying greatly in distance from the grids at different points.

Furthermore, this device obviates any necessity for providing additional means for the holding of the bread beyond the tray, being thus distinguished from double bread holders enclosing the bread on both sides as is necessary in toasters of the turnover type heretofore known where provision is made for the inspection of the face of the toast.

This invention may be developed within the scope of the following claims without departing from the essential features of the said invention, and it is desired that the specification and drawings be read as merely illustrative and not in a limiting sense, except as necessitated by the prior art.

What I claim is:—

1. In a device of the class described, bread supporting and turning means comprising an approximately upright grid, a downwardly swingable tray cooperating with said grid in the positioning of bread in said device, said tray including upper and lower parts hinged together intermediate of the length of said tray whereby the lower part may be swung downwardly and the upper part swung inwardly with respect thereto, and guide members limiting the inward swinging of the upper part of said tray.

2. In a device of the class described, an approximately upright grid, a two-part tray, the lower part of which is adapted to swing outwardly of said grid and the upper part hinged to and adapted to be flexed inwardly of said lower part when it is lowered, whereby a bread receiving pocket is formed, and means guiding the upper edge of the said tray during the flexed downward movement of the upper part of said tray whereby such upper edge is moved in spaced relation to said grid.

3. In a device of the class described, an approximately upright grid, a two-part tray, the lower part of which is adapted to swing outwardly of said grid and the upper part hinged to and adapted to be flexed inwardly in relation to said lower part when it is lowered, whereby a bread receiving pocket is formed, and means guiding the upper edge of the upper part of said tray downwardly before and outwardly of said grid during the downward flexed movement of the upper part of said tray whereby the spacing of the said upper edge from said grid is increased during such downward movement.

4. In a device of the class described, a base, a frame in the form of an inverted U-shaped member, the legs of which are secured in said base, a transverse member extending between the lower parts of the legs of said U-shaped member, a tray hingedly connected to said transverse member, and grid members extending between the upper part of the U-shaped member and said transverse member.

5. In a vertical toaster, a base, a pair of outwardly and downwardly swingable trays, tray-carrying, U-shaped members mounted on said base, end plates outwardly extending across the adjacent legs of said U-shaped members, clips securing said end plates to said members, and heating elements supported by said clips intermediate of said U-shaped members.

6. In a vertical toaster, a base, a pair of outwardly and downwardly swingable trays, a pair of tray carrying inverted U-shaped members mounted on said base, a vertical heating element, and means supporting said heating element from and between said U-shaped members.

In testimony whereof I affix my signature.

FREDERICK A. VOLLBRECHT.